United States Patent
Morin et al.

(10) Patent No.: US 11,276,103 B2
(45) Date of Patent: Mar. 15, 2022

(54) EVALUATING PRESENTATION OF PRODUCTS OFFERED BY A PUBLISHING USER BASED ON CONTENT ITEMS PROVIDED TO AN ONLINE SYSTEM BY OTHER USERS

(71) Applicant: Meta Platforms, Inc., Menlo Park, CA (US)

(72) Inventors: Steve Morin, San Francisco, CA (US); Anuj Madan, San Mateo, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 18 days.

(21) Appl. No.: 16/917,866

(22) Filed: Jun. 30, 2020

(65) Prior Publication Data

US 2021/0406979 A1  Dec. 30, 2021

(51) Int. Cl.
*G06Q 30/00* (2012.01)
*G06Q 30/06* (2012.01)
(Continued)

(52) U.S. Cl.
CPC ... *G06Q 30/0631* (2013.01); *G06F 16/24578* (2019.01); *G06F 16/9535* (2019.01); *G06K 9/00624* (2013.01); *G06N 5/04* (2013.01); *G06N 20/00* (2019.01); *G06Q 30/0201* (2013.01); *G06Q 30/0255* (2013.01);
(Continued)

(58) Field of Classification Search
None
See application file for complete search history.

(56) References Cited

U.S. PATENT DOCUMENTS 9,767,505 B1 * 9/2017 Shi ..................... G06Q 30/0631
10,706,452 B1  7/2020 Ghamsari et al.
(Continued)

FOREIGN PATENT DOCUMENTS

WO  2016191685 A1  12/2016

OTHER PUBLICATIONS

Goel, Nishant, "Shopbot: An Image Based Search Application for E-Commerce Domain" Master's Projects. 516. DOI: https://doi.org/10.31979/etd.r7a5-6dzf https://scholarworks.sjsu.edu/etd_projects/516 (Year: 2017).*
(Continued)

*Primary Examiner* — Naeem U Haq
(74) *Attorney, Agent, or Firm* — Fenwick & West LLP (57) ABSTRACT

A publishing user identifies a product offered by the user to an online system by providing multiple images of various products viewed at different angles to the online system. The online system applies an identification model to content items obtained from other users to identify one or more of the products in various content items. From a number of content items obtained from other users that include products offered by the publishing user, the online system compute trends. The trends may be for a specific product or products having one or more common attributes. The online system transmits information about the trends to the publishing user or to other users. The trends may also be used to rank recommendations for products to a specific user, where the trends from numbers of content items including products are weighted by the specific user's preferences.

18 Claims, 4 Drawing Sheets

(51) Int. Cl.
    *G06Q 50/00*     (2012.01)
    *G06F 16/2457*     (2019.01)
    *G06N 20/00*     (2019.01)
    *G06N 5/04*     (2006.01)
    *G06T 15/00*     (2011.01)
    *H04L 67/306*     (2022.01)
    *G06K 9/00*     (2022.01)
    *G06F 16/9535*     (2019.01)
    *G06Q 30/02*     (2012.01)

(52) U.S. Cl.
    CPC ......... *G06Q 30/0275* (2013.01); *G06Q 50/01* (2013.01); *G06T 15/00* (2013.01); *H04L 67/306* (2013.01); *G06Q 30/0603* (2013.01)

(56) References Cited

U.S. PATENT DOCUMENTS

| | | | |
|---|---|---|---|
| 2006/0277145 A1* | 12/2006 | Raccah | G06Q 30/08 705/40 |
| 2011/0119117 A1 | 5/2011 | Yu et al. | |
| 2016/0110794 A1 | 4/2016 | Hsiao et al. | |
| 2016/0210602 A1 | 7/2016 | Siddique et al. | |
| 2016/0371546 A1 | 12/2016 | Yadav et al. | |
| 2017/0076345 A1 | 3/2017 | Pan et al. | |
| 2018/0302682 A1 | 10/2018 | Saxena et al. | |
| 2018/0341907 A1 | 11/2018 | Tucker et al. | |
| 2019/0378204 A1 | 12/2019 | Ayush et al. | |
| 2021/0082037 A1 | 3/2021 | Oh | |

OTHER PUBLICATIONS

Qin, Z. "Introduction to E-Commerce." Springer, Tsinghua University Press, Beijing, 2009, pp. i-517.

United States Office Action, U.S. Appl. No. 16/871,770, dated May 19, 2021, 30 pages.

European Search Report for European Application No. 21172600.5, dated Oct. 6, 2021, 2 pages.

Final Office Action dated Sep. 16, 2021 U.S. Appl. No. 16/871,770, filed May 11, 2020, 33 pages.

* cited by examiner

EVALUATING PRESENTATION OF PRODUCTS OFFERED BY A PUBLISHING USER BASED ON CONTENT ITEMS PROVIDED TO AN ONLINE SYSTEM BY OTHER USERS

BACKGROUND

This disclosure relates generally to display of content by an online system, and more specifically to the online system evaluating presentation of products offered by a publishing user in content items obtained by the online system from users for presentation.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users.

Additionally, many publishing users of an online system offer products for purchase by other users and distribute content items including the offered products to other users via the online system. For example, a publishing user offers home goods for purchase by other user and distributes content items including images of the home goods to other users to increase awareness of the home goods. To allow online system users to more readily purchase products offered by the purchasing user, the publishing user may provide a product page to the online system identifying multiple products offered for purchase by the publishing user. The product page includes one or more images of various products offered by the publishing user, as well as information about different products offered by the publishing user. Additionally, the product page may include one or more options for a viewing user to select and to purchase products offered by the publishing user via the product page.

Content items the online system obtains from various users may include products offered by the publishing user. These content items may include different combinations of products offered by the publishing user that different users have purchased or otherwise obtained. Presentation of different combinations of products by various users may allow the publishing user to identify combinations of products of interest to users, allowing the publishing user to provide recommendations for combinations of products for various other users or to provide additional content to the online system tailored to display combinations of products similar to those displayed by users. However, the online system may obtain a large number of content items including products offered by the publishing user, making it impractical for the publishing user to identify content items including products offered by the publishing user. Similarly, the publishing user may be unable to view content items provided by certain users, limiting the publishing user's ability to accurately evaluate different combinations of products offered by the publishing user.

SUMMARY

An online system obtains information from a publishing user identifying products that a user of the online system offers for purchase by other users. The obtained information includes one or more pictures of each product associated with a product identifier and may also include additional information about each product. For example, the online system obtains a product catalog from the publishing user that includes entries for each product offered by the publishing user. In some embodiments, an entry in the product catalog for a product includes a product identifier of the product, one or more pictures of the product, a name of the product, a type of the product, and a price at which the publishing user offers the product for purchase. An entry in the product catalog for a product may also include a description of the product in some embodiments. Information identifying a product obtained from the publishing user includes multiple pictures of the product in some embodiments, with different pictures corresponding to different positions of the product relative to an image capture device (e.g., a camera) that captured the pictures of the product. The online system stores the information identifying the products offered by the publishing user, which includes one or more pictures of each of the products in association with the publishing user. For example, the online system stores information identifying the products offered by the publishing user in a user profile maintained by the online system for the publishing user or stores the obtained information identifying products offered by the publishing user in association with a user profile identifying the publishing user.

Additionally, the online system obtains content items from various users other than the publishing user for presentation to other users. A content item obtained from a user includes an image or a video and may also include text data or audio data. In various embodiments, a content item includes any combination of text data, audio data, image data, video data for presentation to other users via the online system. One or more content items obtained 310 from users other than the viewing user include an image or a video including a product offered by the publishing user.

The online system leverages content items obtained from users other than the publishing user to provide the publishing user with information about how various products offered by the publishing user are included in content items from other users. For a content item obtained by the online system from a user other than the publishing user, the online system identifies objects from the content item obtained from the user other than the publishing user. In various embodiments, the online system applies one or more object detection methods to an image or to a video included in the content item from the user other than the publishing user that identify objects in the image or in the video within the content item. In various embodiments, the online system uses one or more object detection methods to identify objects within the content item to generate bounding boxes corresponding to each of the identified objects. When identifying objects from the content item, the online system may also identify a category or a type for each identified object. For example, an object detection method applied by the online system associates different types with objects based on characteristics of the objects, and the online system associates a type from the object detection method with an identified object.

The online system compares various objects identified from the content item obtained from the user other than the publishing user to pictures of products included in the information identifying products offered by the publishing user that the online system obtained from the publishing user. In some embodiments, the online system compares each object identified from the content item obtained from the user other than the publishing user to pictures of each of at least a set of products obtained from the publishing user.

When comparing an object identified from the content item obtained from the user other than the publishing user to previously obtained images of products offered by the publishing user, the online system determines a confidence of the identified object matching a product offered by the publishing user.

To compare the object identified in the content item obtained from the user other than the publishing user to a specific product offered by the publishing user, the online system applies an identification model to the identified object and to the pictures obtained from the publishing user of various products offered by the publishing user. The online system trains the machine learning identification model from comparisons of objects identified from images to products identified to the online system by various users and may also account for comparisons of objects to publicly available information identifying different products when training the identification model. The online system trains the identification model to determine a likelihood of an object identified from a content item (e.g., an image or a video included in the content item) matching a product offered by the purchasing user based on prior matching of objects in content items to different products. For example, the online system applies a label indicating a product matching an object identified from the content item to characteristics of the object identified from the content item. From the labeled characteristics of objects extracted from content items, the online system trains the identification model using any suitable training method or combination of training methods (e.g., back propagation to train the identification model if it is a neural network, curve fitting techniques if the identification model is a linear regression). After training, the online system applies the trained identification model to characteristics of objects identified within a content item and to characteristics of a product offered by the publishing user, and the identification model outputs a confidence of the object matching a product.

Responsive to online system determining the confidence of an object identified from the content item obtained by the user other than the publishing user has at least a threshold confidence value of matching the product, the online system determines the content item includes the product offered by the publishing user. The online system stores information identifying each product offered by the publishing user for which at least one object identified in the content item obtained from the user other than the publishing user has at least the threshold confidence value of matching in association with the content item. Hence, the online system stores information in association with the content item obtained from the user other than the publishing user that identifies each product offered by the publishing user that the online system determined was included in the content item. The online system applies the identification model to multiple content items obtained from various users other than the publishing user to generate information identifying products offered by the publishing user included in different content items obtained from different users other than the publishing user.

From the information stored in association with content items obtained from users other than the publishing user, the online system evaluates inclusion of products offered by the publishing user in content items from other users. For example, the online system determines frequencies at which different products offered by the publishing user are included in content items obtained from other users during a time interval. As an example, the online system determines a number of different content items obtained from other users that include different products offered by the publishing user within a month of a current time. The online system ranks various products offered by the publishing user based on the number of different content items including different products and transmits the ranking to the publishing user. This allows the publishing user to identify how often different products offered from the publishing user are included in content items obtained from other users. In some embodiments, the online system displays three-dimensional reconstructions of products offered by the publishing user that have at least a threshold position in the ranking, allowing the publishing user to more readily identify and review products included in content items from other users with at least a threshold frequency.

In some embodiments, the publishing user specifies one or more attributes of products, and the online system generates information describing inclusion of products having the specified one or more attributes in content items obtained from other users. For example, the online system selects products having the one or more specific attributes and evaluates inclusion of the selected products in content items obtained from other users. The online system ranks the selected products by numbers of different content items in a specific interval, as further described above. Hence, the online system may transmit information to the publishing user identifying a number of content items including products having specific attributes that the online system obtained from other users during a specific time interval.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
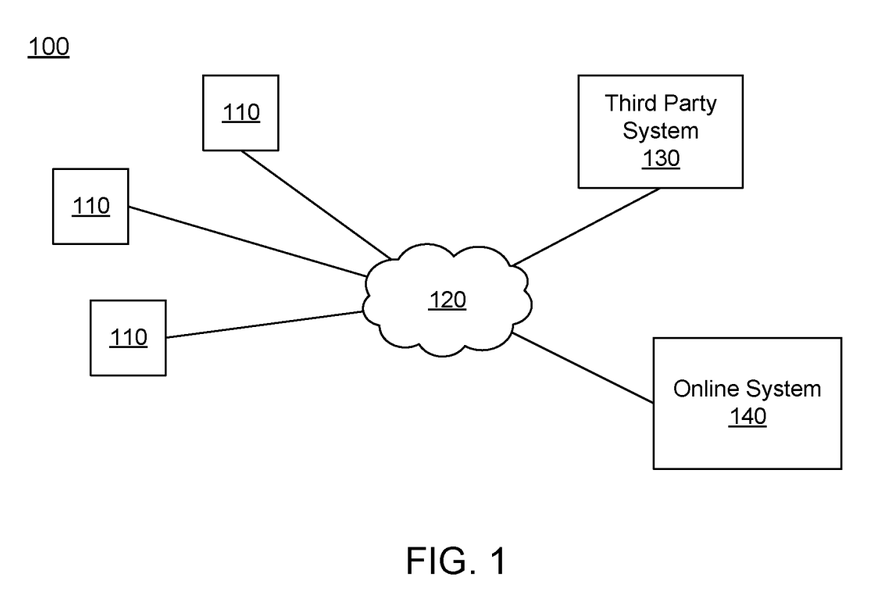
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
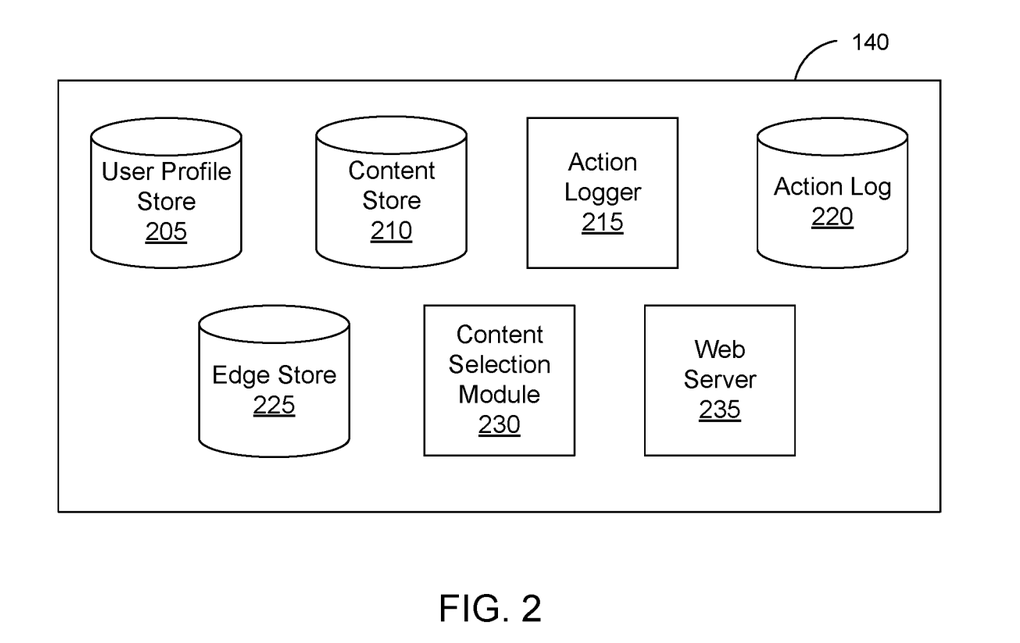
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

In various embodiments, the online system 140 receives information from a user identifying various products that the user offers for purchase. The obtained information includes one or more pictures of each product associated with a product identifier and may also include additional information about each product. For example, the online system 140 obtains a product catalog from a user that includes entries for each product offered by the user. In some embodiments, an entry in the product catalog for a product includes a product identifier of the product, one or more pictures of the product, a name of the product, and a price at which the user offers the product for purchase. An entry in the product catalog for a product may also include a description of the product in some embodiments. Information identifying a product obtained from a user includes multiple pictures of the product in some embodiments, with different pictures corresponding to different positions of the product relative to an image capture device (e.g., a camera) that captured the pictures of the product. The online system 140 stores the information identifying the products offered by the user, which includes one or more pictures of each of the products in association with the user in a user profile for the user in the user profile store 205 in various embodiments. Alternatively, the online system 140 stores the obtained information describing products offered by the user in the content store 210 along with an association between the user profile of the user and the obtained information.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 are "sponsored content items" that include content for presentation to a user and for which the online system 140 receives compensation from a user from whom the online system 140 obtained the sponsored content item in exchange for presenting the content item to another user, which may be contingent on whether the other user performs a specific action after the content from the sponsored content item is displayed to the other user. In various embodiments, the content also specifies a page of content. For example, a sponsored content item includes a landing page specifying a network address of a page of content to which a user is directed when the content item is accessed. In various embodiments, a bid amount of a sponsored content item specifies an amount of compensation the online system 140 receives in exchange for displaying the sponsored content item to users. The bid amount may be used to determine an expected value, such as monetary compensation, provided by the user to the online system 140 if content in the sponsored content item is presented to a viewing user, if the content in the sponsored content item receives an interaction from the viewing user when presented, or if any suitable condition is satisfied when content in the sponsored content item is presented to a user. For example, the bid amount of a sponsored content item specifies a monetary amount that the online system 140 receives from a user who provided the sponsored content item to the online system 140 if content in the sponsored content item is displayed. In some embodiments, the expected value to the online system 140 of presenting the content from the sponsored content item may be determined by multiplying the bid amount by a probability of the content of the content item being accessed by a user.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

Various content items, such as sponsored content items, may include an objective identifying an interaction that a user associated with a content item desires other users to perform when presented with content included in the content item. Example objectives include installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. One or more objectives may identify a specific interaction with a landing page to which a content item, such as a sponsored content item, includes a link. Example specific interactions with the landing page include: establishing a connection to the landing page via the online system 140, transmitting a message to the publishing user through the online system via a link included on the landing page, indicating a preference for one or more content items included on the landing page, selecting a link to a website in a different domain than the online system 140 included on the landing page, selecting a link on the landing page to establish a telephone call to the publishing user, purchasing one or more products via the landing page, selecting a link on the landing page to obtain directions to a physical location associated with the publishing user, selecting a link on the landing page to transmit an electronic mail message to the publishing user, and any combination thereof. Additionally, the online system 140 receives compensation from a user associated with content item as online system users perform interactions with a content item that satisfy the objective included in the content item.

Additionally, a content item, such as a sponsored content item, may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In various embodiments, the content store 210 includes multiple campaigns, which each include one or more content items. In various embodiments, a campaign in associated with one or more characteristics that are attributed to each content item of the campaign. For example, a bid amount associated with a campaign is associated with each content item of the campaign. Similarly, an objective associated with a campaign is associated with each content item of the campaign. In various embodiments, a user providing content items to the online system 140 provides the online system 140 with various campaigns each including content items having different characteristics (e.g., associated with different content, including different types of content for presentation), and the campaigns are stored in the content store.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

Additionally, in various embodiments, the content store 210 includes one or more content reels, with each content reel including one or more content items. A content reel includes one or more content items and an order in which the content items are displayed when the content reel is displayed. A user selects content items for inclusion in a content reel, and the content store 210 stores an identifier of content reel in association with an identifier of the user and with identifiers of content items included in the content reel, and the order in which the content items are to be displayed. In various embodiments, content items are included in a content reel for a specific amount of time, and a content item is removed from the content reel after the specific amount of time from the inclusion of the content item in the content reel. For example, the online system 140 removes an association between an identifier of a content item and an identifier of a content reel 24 hours after a time when the content item was included in the content reel by a user associated with the content reel.

The action logger 215 receives communications about user actions (or "interactions") internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a reaction to an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. In some embodiments, when determining a measure of relevance of a content item to a user, the content selection module 230 determines a likelihood of the user performing a specific interaction with a page of content to which the content item includes a link after being presented with the content item (e.g., within a threshold amount of time of the content item being presented to the user); in various embodiments, the specific interaction is associated with the content item by a publishing user from whom the online system 140 obtained the content item. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with content items when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of the user interacting with the content item. In various embodiments, the expected value associated with a content item is a product of a bid amount included in the content item and a likelihood of the user performing a specific interaction with a landing page to which the content item includes a link after the content item is displayed to the user. The specific interaction with the landing page is specified by a publishing user from whom the online system 140 obtained the content item in various embodiments. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed may include one or more content items associated with bid amounts and other content items, such as stories describing actions associated with other online system users connected to the user, which are not associated with bid amounts. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a newsfeed including a plurality of content items selected for presentation to the user. One or more content items may also be included in the feed. The content selection module 230 may also determine the order in which selected content items are presented via the feed. For example, the content selection module 230 orders content items in the feed based on likelihoods of the user interacting with various content items.

In various embodiments, the content selection module 230 trains and stores one or more machine learning models that identify objects within an image, or within video, included in a content item and that determine confidences of an identified object matching a product offered by a user from whom the content item was obtained. In various embodiments, the content selection model 230 maintains one or more machine learned models trained to identify objects within an image or video and maintains a separate machine learned identification model that compares an object identified within an image or within video to pictures of products offered bur purchase by a user from whom the image or the video was obtained. As further described below in conjunction with FIG. 3, the identification model determines confidences of an object identified within an image or within video matching different products offered by the user based on characteristics of the identified object and characteristics of pictures of different products offered by the user.

From pictures of products obtained from a publishing user, the content selection module 230 identifies content items obtained from other users different than the publishing user that include various products offered by the purchasing user via the identification model. As further described below in conjunction with FIG. 3, the content selection module 230 determines numbers of content items obtained from other users that include various products offered by the purchasing user, allowing the content selection module 230 to determine numbers of content items including different products offered by the purchasing user during a specific time interval. As further described below in conjunction with FIG. 3, the online system 140 transmits information to the publishing user, or to another user, identifying occurrences of products offered by the publishing user in content items obtained from other users, allowing the publishing user, or the other user, to evaluate how frequently other users include different products offered by the publishing user in content items provided to the online system 140.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Figure 3:
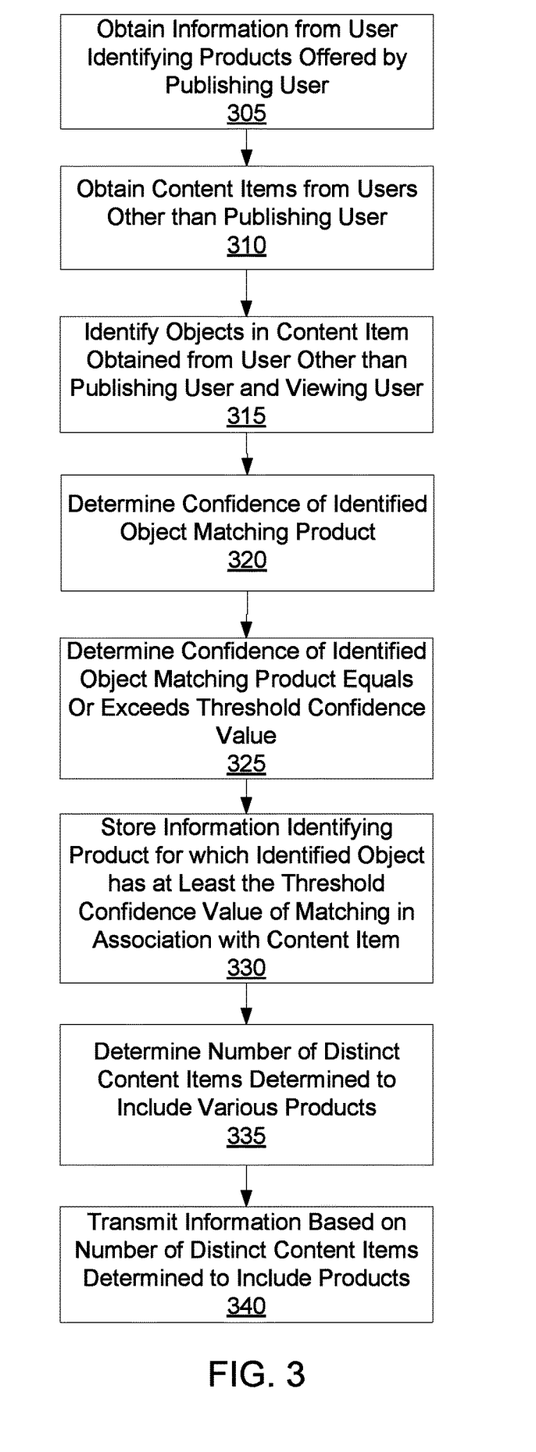
FIG. 3 is a flowchart of a method for an online system identifying numbers of content items from users including various products offered by a publishing user, in accordance with an embodiment.

Identifying Occurrences of Products from a Publishing User in Content Items from Other Users FIG. 3 is a flowchart of one embodiment of a method for an online system 140 to identify occurrences of products offered by a publishing user in content items obtained from other users. For purposes of illustration, FIG. 3 describes the method in conjunction with identification of products offered by a user within an image obtained by the user, but the method described in conjunction with FIG. 3 may also be used to identify products offered by a user within a video obtained from the user (e.g., the method may be applied to frames of the video obtained from the user as described below in conjunction with FIG. 3 with regard to an image obtained from the user). In various embodiments, the method may include different or additional steps than those described in conjunction with FIG. 3. Additionally, in some embodiments, the method may perform the steps in different orders than the order described in conjunction with FIG. 3.

An online system 140, as further described above in conjunction with FIG. 2, obtains 305 information from a publishing user identifying products that the publishing user of the online system 140 offers for purchase by other users. The obtained information includes one or more images of each product associated with a product identifier and may also include additional information about each product. The obtained information may also include one or more videos of each product associated with a product identifier. For example, the online system 140 obtains 305 a product catalog from the publishing user that includes entries for each product offered by the user. In some embodiments, an entry in the product catalog for a product includes a product identifier of the product, one or more images of the product, a name of the product, a type of the product, a type of the product, one or more attributes of the product, and a price at which the user offers the product for purchase. An entry in the product catalog for a product may also include a description of the product in some embodiments. Information identifying a product obtained 305 from the publishing user includes multiple images of the product, with different images corresponding to different positions of the product relative to an image capture device (e.g., a camera) that captured the images of the product; hence, different images of the product correspond to different angle at which the product is viewed. The online system 140 stores the information identifying the products offered by the publishing user, which includes one or more images of each of the products corresponding to different angles at which the products are viewed in association with the publishing user. For example, the online system 140 stores information identifying the products offered by the publishing user in a user profile maintained by the online system 140 for the publishing user or stores the obtained information identifying products offered by the publishing user in association with a user profile identifying the publishing user.

Additionally, the online system 140 obtains 310 content items from various users other than the publishing user for presentation to other users. A content item obtained 310 from a user includes an image or a video and may also include text data or audio data. In various embodiments, a content item includes any combination of text data, audio data, image data, and video data for presentation to other users via the online system 140. One or more content items obtained 310 from users other than the viewing user include an image or a video including one or more products offered by the publishing user. The online system 140 leverages content items including products offered by the publishing user to augment information stored by the online system 140 identifying products offered by the publishing user.

The online system 140 leverages content items obtained from users other than the publishing user to provide the publishing user with information about how various products offered by the publishing user are included in content items from other users. For a content item obtained 310 by the online system 140 from a user other than the publishing user, the online system 140 identifies 315 objects from the content item obtained 310 from the user other than the publishing user. In various embodiments, the online system 140 applies one or more object detection methods to an image or to a video included in the content item from the user other than the publishing user that identify objects in the image or in the video within the content item. In various embodiments, the online system 140 uses one or more object detection methods to identify objects within the content item to generate bounding boxes corresponding to each of the identified objects. When identifying objects from the content item, the online system 140 may also identify a category or a type for each identified object. For example, an object detection method applied by the online system 140 associates different types with objects based on characteristics of the objects, and the online system 140 associates a type from the object detection method with an identified object.

The online system 140 compares various objects identified from the content item obtained 310 from the user other than the publishing user to pictures of products included in the information identifying products offered by the publishing user that the online system 140 obtained 305 from the publishing user. In some embodiments, the online system 140 compares each object identified from the content item obtained 310 from the user other than the publishing user to pictures of each of at least a set of products obtained 305 from the publishing user; alternatively, the online system 140 compares each object identified from the content item obtained 310 from the user other than the publishing user to pictures of each product obtained 305 from the publishing user. When comparing an object identified from the content item obtained 310 from the user other than the publishing user to previously obtained 305 images of products offered by the publishing user, the online system 140 determines a confidence 320 of the identified object matching a product offered by the publishing user.

To compare the object identified in the content item obtained 310 from the user other than the publishing user to a specific product offered by the publishing user, the online system 140 applies an identification model to the identified object and to the pictures obtained 305 from the publishing user of various products offered by the publishing user. The online system 140 trains the machine learning identification model from comparisons of objects identified from images to products identified to the online system 140 by various users and may also account for comparisons of objects to publicly available information identifying different products when training the identification model. The online system 140 trains the identification model to determine a likelihood of an object identified from a content item (e.g., an image or a video included in the content item) matching a product offered by the purchasing user based on prior matching of objects in content items to different products. For example, the online system 140 applies a label indicating a product matching an object identified from the content item to characteristics of the object identified from the content item. From the labeled characteristics of objects extracted from content items, the online system 140 trains the identification model using any suitable training method or combination of training methods (e.g., back propagation to train the identification model if it is a neural network, curve fitting techniques if the identification model is a linear regression). After training, the online system 140 applies the trained identification model to characteristics of objects identified within a content item and to characteristics of a product offered by the publishing user, and the identification model outputs a confidence of the object matching a product.

Responsive to online system 140 determining 325 the confidence of an object identified from the content item obtained 310 by the user other than the publishing user has at least a threshold confidence value of matching a product offered by the publishing user, the online system 140 determines the content item includes the product offered by the publishing user. The online system 140 stores 330 information identifying each product offered by the publishing user for which the online system 140 determined 325 at least one object identified in the content item obtained 310 from the user other than the publishing user has at least the threshold confidence value of matching in association with the content item. Hence, the online system 140 stores 330 information in association with the content item obtained 310 from the user other than the publishing user identifying each product offered by the publishing user that the online system 140 determined was included in the content item (i.e., product offered by the publishing user for which at least one object identified in the content item obtained 310 from the user other than the publishing user has at least the threshold confidence value of matching). The online system 140 applies the identification model to multiple content items obtained 310 from various users other than the publishing user, as further described above, to generate information identifying products offered by the publishing user that are included in different content items obtained 310 from different users other than the publishing user.

From the information stored 330 in association with content items obtained from users other than the publishing user, the online system 140 evaluates inclusion of one or more products offered by the purchasing user in the content items. For example, the online system 140 determines 335 a number of different content items obtained 310 from other users that include each product of at least a set of products offered by the publishing user. Hence, for multiple products offered by the publishing user, the online system 140 determines 335 a number of distinct content items determined to include a product. In some embodiments, the online system 140 determines a number of different content items obtained 310 from users other than the publishing user within a specific time interval determined to include each of various products offered by the publishing user. The publishing user may specific the specific time interval (e.g., a month) during which the online system 140 determines numbers of different content items including various products offered by the publishing user.

The online system 140 transmits 340 information based on numbers of distinct content items determined to include various products to the publishing user, or to another user. For example, the online system 140 ranks various products offered by the publishing user (e.g., at least a set of products offered by the publishing user) based on the number of different content items obtained 310 from other users including each different product and transmits 340 the ranking to the publishing user. In various embodiments, the transmitted ranking includes a number of distinct content items determined to include each product included in the ranking. This allows the publishing user to identify how often different products are included in content items obtained 310 from other users. In some embodiments, the online system 140 generates three-dimensional reconstructions of various products offered by the publishing user and displays the three-dimensional reconstructions of products offered by the publishing user that have at least a threshold position in the ranking, allowing the publishing user to more readily identify and review products included in content items from other users with at least a threshold frequency. The online system 140 may generate a three-dimensional reconstruction of a product from pictures of the product obtained 305 from the publishing user as well as images of the product included in content items obtained 310 from other users. For example, the online system 140 applies one or more three dimensional reconstruction processes to the pictures of the product from different angles obtained from the publishing user and to the content items from users other than the publishing user determined to include the product. Example three dimensional reconstruction methods include Generative adversarial networks (GANs), projective reconstruction, affine reconstruction, Euclidean reconstruction, or any other suitable rendering method based on multiple images of the product.

In some embodiments, the publishing user specifies one or more attributes of products, and the online system 140 generates information describing inclusion of products having the specified one or more attributes in content items obtained 310 from other users. For example, the online system 140 selects products having the one or more specific attributes and evaluates inclusion of the selected products in content items obtained 310 from other users. The online system 140 ranks the selected products by numbers of different content items in a specific interval, as further described above. Hence, the online system 140 may transmit information to the publishing user identifying a number of content items including products having specific attributes that the online system 140 obtained 310 from other users during a specific time interval.

In addition to identifying numbers of content items including products having a specific attribute, or having a combination of attributes, the online system 140 may identify a number of content items that include a combination of products. Hence, the online system 140 identifies a number of content items in which the online system 140 identified all products in a specified combination, allowing the publishing user to evaluate numbers of content items including a combination of products. The publishing user may specify the combination of products, or the online system 140 may determine a combination of products using any suitable method.

In some embodiments, the online system 140 generates an embedding for each product offered by the publishing user. The embedding for a product has multiple dimensions, with different dimensions corresponding to different information about the product. For example, dimensions of an embedding describe attributes of the product included in information obtained 305 from the publishing user. However, in various embodiments, dimensions of an embedding describe any suitable information about a product corresponding to the embedding. Hence, an embedding corresponding to a product is a high dimensional vector in a latent space describing the product based on information associated with the product by the online system 140. Various methods may be used by the online system 140 to generate an embedding corresponding to a user in different embodiments. Alternatively, the online system 140 obtains 305 embeddings for different products from the publishing user.

The online system 140 clusters products in some embodiments and transmits information to the publishing user describing different clusters of products. For example, the online system 140 identifies products having at least a threshold position in a ranking based on numbers of content items obtained 310 from other users including the products and generates clusters for products having at least the threshold position of the ranking. Clustering the products based on their corresponding embeddings allows different clusters of products to represent different combinations of attributes of products offered by the publishing user. Any suitable method may be used to cluster the products; for example, the online system 140 uses K-means clustering to cluster products based on the embeddings corresponding to each of the products. The online system 140 transmits information identifying one or more of the clusters of products to the publishing user, allowing the publishing user to identify products with similar or with common characteristics that other users include in content items.

Additionally or alternatively, the online system 140 may account for an affinity between a specific user and other users from whom the online system 140 obtained 310 content items including products offered by the publishing user, as well as numbers of content items including various products offered by the publishing user obtained 310 from other users. As further described above in conjunction with FIG. 2, the specific user's affinity for another user approximates the specific user's interest in the other user based on actions performed by the specific user. A higher affinity by the specific user for another user indicates that the specific user has greater interest in the other user, indicating that the specific user is more likely interested in content items the online system 140 obtained 310 from the other user. In some embodiments, the online system 140 transmits information identifying one or more other products identified in content items obtained 310 from other users with whom the specific user has at least a threshold affinity. Similarly, the online system 140 may account for affinities between the specific user and other users from whom content items are obtained 310 when ranking products based on numbers of content items from other users that include one or more of the products. For example, the online system 140 weights an occurrence of an additional product in a content item by a value based on an affinity of the specific user for the other user from whom the content item was obtained 310. In various embodiments, the value by which the occurrence of a product in a content item is weighted is directly related (e.g., directly proportional) to the affinity of the specific user for the other user from whom the online system 140 obtained 310 the content item including the product. The online system 140 ranks various products based on their weighted occurrences in content items (e.g., by summing the weighted number of content items including different products) and transmits information identifying one or more products offered by the publishing user having at least a threshold position in the ranking or identifying a product having a maximum position in the ranking. Thus, the online system 140 may account for a specific user's likely interest in content items obtained 310 from different other users when identifying products in content items obtained 310 from other users to the specific user, personalizing the content items identified to the specific user based on the specific user's likely interest in content items from other users.

Figure 4A:
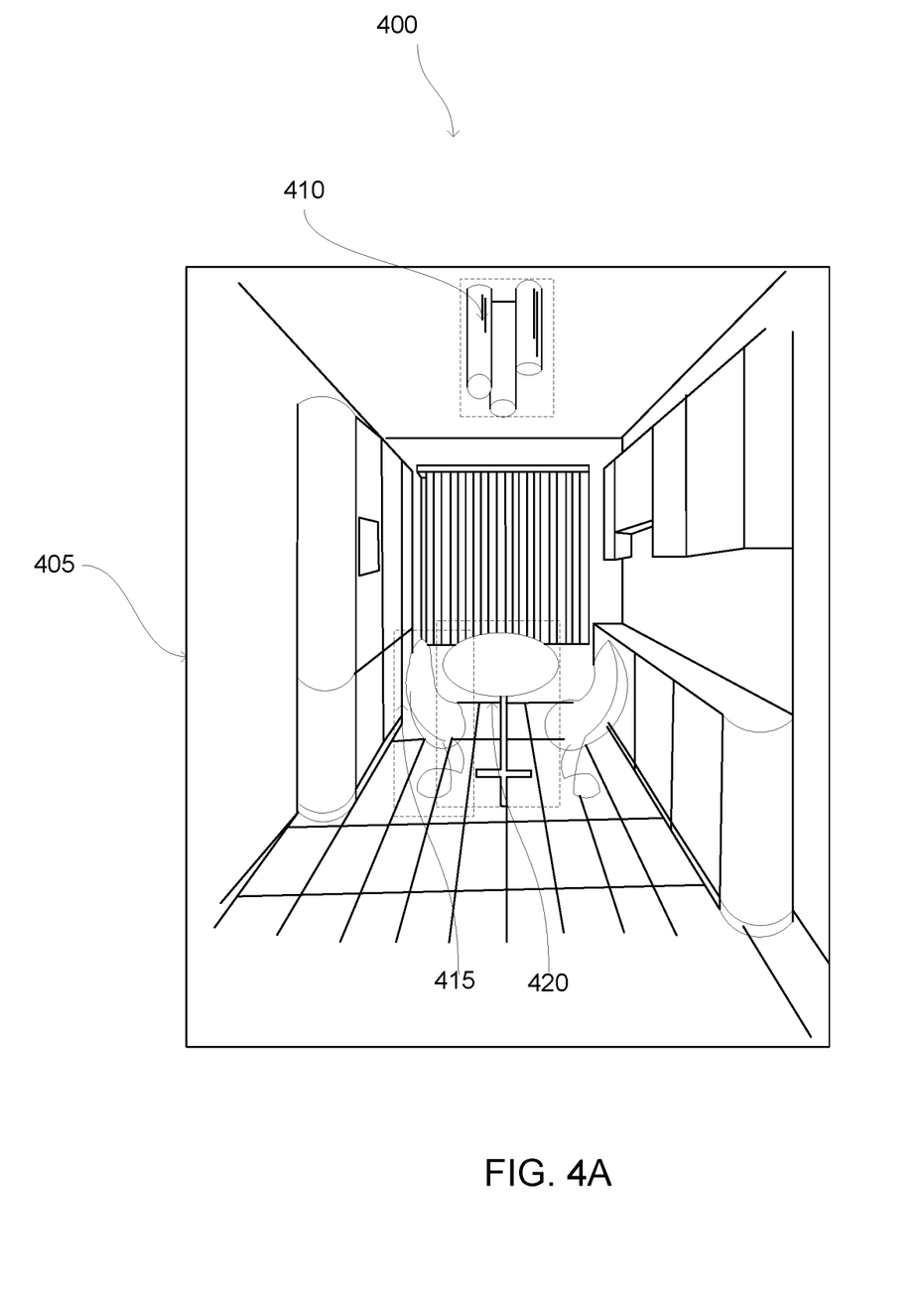
FIG. 4A is an example content item obtained by an online system from a user other than a publishing user that includes objects corresponding to multiple products offered by the purchasing user, in accordance with an embodiment.

FIG. 4A is an example content item 405 obtained by an online system 140 from a user other than a viewing user that includes objects corresponding to multiple products offered by a purchasing user. In the example of FIG. 4A, the content item 405 includes objects corresponding to products 410, 415, 420 offered by the publishing user. The online system 140 applies an identification model to the content item 405 and to information identifying products offered by the purchasing user to determine that objects included in the content item 405 correspond to each different product 410, 415, 420. Hence, the identification model allows the online system 140 to identify that the content item 405 includes different products 410, 415 420 offered by the publishing user.

Figure 4B:
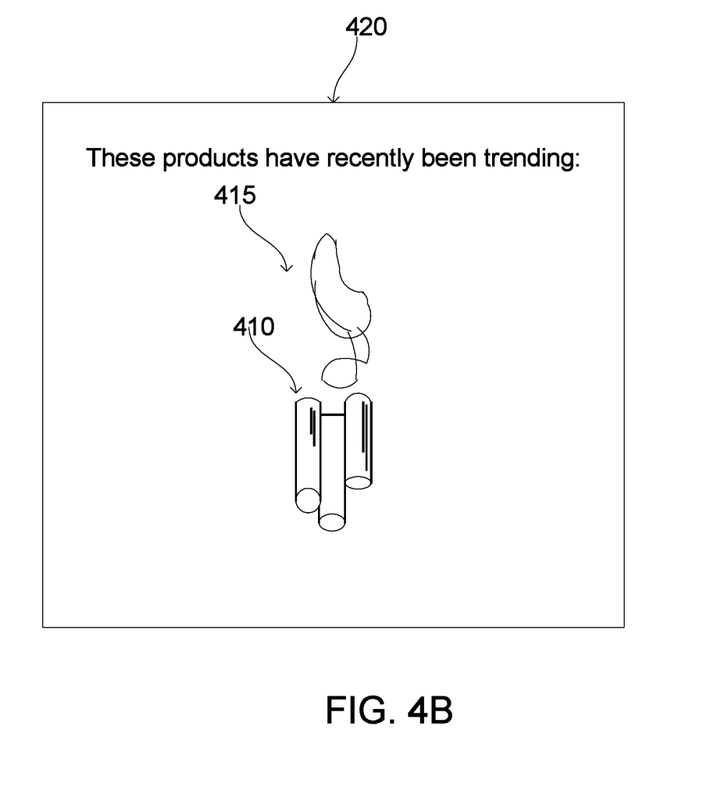
FIG. 4B is an example message transmitted from the online system to the publishing user describing occurrences of products offered by the publishing user in a content item from other users, in accordance with an embodiment.

As further described above in conjunction with FIG. 3, the online system 140 transmits information describing occurrences of products 410, 415, 420 in content items obtained from other users to the publishing user. FIG. 4B is an example message 420 transmitted to the publishing user describing inclusion of products 410, 415, 420 offered by the publishing user in content items obtained from other users. In the example of FIG. 4B, the message 420 includes images of products having at least a threshold position in a ranking of products based on number of content items obtained from other users that include the products. As shown in FIG. 4B, product 410 and product 415 have at least the threshold position in the ranking. In the example shown by FIG. 4B, product 410 and product 415 are ordered based on their positions in the ranking, so product 415 has a higher position in the ranking than product 410. However, in other embodiments, the message 420 includes a full listing of products ordered according to their positions in the ranking; similarly, the message 420 includes alternative or additional information identifying different products (e.g., names or textural descriptions of products) included in content items obtained from other users. The online system 140 may transmit message 420 to the publishing user in some embodiments, and may alternatively or additionally transmit message 420 to other users.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    obtaining information identifying products offered by a publishing user of an online system, the obtained information including one or more pictures of a product corresponding to different angles of the product;
    obtaining, at the online system, content items from one or more other users of the online system other than the publishing user;
    determining, by the online system, a confidence of one or more object identified in one or more content items obtained from one or more users other than the publishing user matching a product by applying an identification model to the one or more objects identified in one or more content items and to the pictures of one or more products obtained from the publishing user;
    determining that a content item obtained from a user other than the publishing user includes a product offered by the publishing user in response to a confidence of the object identified in the content item obtained from the user other than the publishing user and matching the specific product equaling or exceeding a threshold confidence value;
    determining, by the online system, a number of content items obtained from users other than the publishing user during a time interval determined to include various products offered by the publishing user; and
    transmitting information from the online system to the publishing user identifying the number of content items obtained from users other than the publishing user during the time interval determined to include one or more products offered by the publishing user by:
        ranking at least a set of products offered by the publishing user based on numbers of content items obtained from users other than the publishing users determined to include different products of the set;
        generating, by the online system, a three-dimensional reconstruction of each product of the set having at least a threshold position in the ranking; and
        transmitting the ranking including the three-dimensional reconstructions of each product of the set having at least the threshold position in the ranking to the publishing user.

2. The method of claim 1, wherein the ranking includes a number of content items obtained from users other than the publishing users determined to include a product of the set corresponding to each product of the set.

3. The method of claim 1, wherein the three dimensional reconstruction of a product of the set is generated from one or more pictures of the product of the set obtained from the publishing user and from one or more content items obtained from other users determined to include the product of the set.

4. The method of claim 1, wherein determining, by the online system, the number of content items obtained from users other than the publishing user during the time interval determined to include various products offered by the publishing user comprises:
    receiving one or more attributes of products at the online system from the publishing user;
    selecting, by the online system, a set of products offered by the publishing user that have the one or more attributes; and
    determining a number of content items obtained from users other than the publishing user during the time interval determined to include at least one product of the set.

5. The method of claim 4, wherein transmitting information from the online system to the publishing user identifying the number of content items obtained from users other than the publishing user during the time interval determined to include one or more products offered by the publishing user comprises:
    ranking the set of products offered by the publishing user based on numbers of content items obtained from users other than the publishing users determined to include different products of the set; and
    transmitting the ranking to the publishing user.

6. The method of claim 1, wherein determining, by the online system, the number of content items obtained from users other than the publishing user during the time interval determined to include various products offered by the publishing user comprises:
 identifying a combination of products at the online system from the publishing user; and
 determining a number of content items obtained from users other than the publishing user during the time interval determined to include all products of the identified combination of products.

7. The method of claim 6, wherein transmitting information from the online system to the publishing user identifying the number of content items obtained from users other than the publishing user during the time interval determined to include one or more products offered by the publishing user comprises:
 transmitting the determined number of obtained from users other than the publishing user during the time interval determined to include all products of the identified combination of products from the online system to the publishing user.

8. The method of claim 1, wherein transmitting information from the online system to the publishing user identifying the number of content items obtained from users other than the publishing user during the time interval determined to include one or more products offered by the publishing user comprises:
 ranking at least a set of products offered by the publishing user based on numbers of content items obtained from users other than the publishing users determined to include different products of the set;
 identifying products having at least a threshold position;
 generating one or more clusters for products having at least the threshold position in the ranking; and
 transmitting information identifying the one or more clusters to the publishing user.

9. The method of claim 8, wherein a cluster of products is generated based on embeddings corresponding to products offered by the purchasing user.

10. The method of claim 1, further comprising;
 identifying a specific user of the online system;
 retrieving affinities of the specific user for each of at least a set of the other users from whom the online system obtained content items;
 ranking at least a set of products offered by the publishing user based on numbers of content items obtained from users other than the publishing users determined to include different products of the set and affinities of the specific user for other users from whom content items determined to include different products of the set were obtained;
 transmitting information identifying one or more products offered by the publishing user to the specific user based on the ranking.

11. A computer program product comprising a non-transitory computer readable storage medium having instructions encoded thereon that, when executed by a processor cause the processor to:
 obtain information identifying products offered by a publishing user of an online system, the obtained information including one or more pictures of a product corresponding to different angles of the product;
 obtain, at the online system, content items from one or more other users of the online system other than the publishing user;
 determine, by the online system, a confidence of one or more object identified in one or more content items obtained from one or more users other than the publishing user matching a product by applying an identification model to the one or more objects identified in one or more content items and to the pictures of one or more products obtained from the publishing user;
 determine that a content item obtained from a user other than the publishing user includes a product offered by the publishing user in response to a confidence of the object identified in the content item obtained from the user other than the publishing user and matching the specific product equaling or exceeding a threshold confidence value;
 determine, by the online system, a number of content items obtained from users other than the publishing user during a time interval determined to include various products offered by the publishing user; and
 transmit information from the online system to the publishing user identifying the number of content items obtained from users other than the publishing user during the time interval determined to include one or more products offered by the publishing user by:
  ranking at least a set of products offered by the publishing user based on numbers of content items obtained from users other than the publishing users determined to include different products of the set;
  generating, by the online system, a three-dimensional reconstruction of each product of the set having at least a threshold position in the ranking; and
  transmitting the ranking including the three-dimensional reconstructions of each product of the set having at least the threshold position in the ranking to the publishing user.

12. The computer program product of claim 11, wherein the three dimensional reconstruction of a product of the set is generated from one or more pictures of the product of the set obtained from the publishing user and from one or more content items obtained from other users determined to include the product of the set.

13. The computer program product of claim 11, wherein determine, by the online system, the number of content items obtained from users other than the publishing user during the time interval determined to include various products offered by the publishing user comprises:
 receive one or more attributes of products at the online system from the publishing user;
 select, by the online system, a set of products offered by the publishing user that have the one or more attributes; and
 determine a number of content items obtained from users other than the publishing user during the time interval determined to include at least one product of the set.

14. The computer program product of claim 13, wherein transmit information from the online system to the publishing user identifying the number of content items obtained from users other than the publishing user during the time interval determined to include one or more products offered by the publishing user comprises:
 rank the set of products offered by the publishing user based on numbers of content items obtained from users other than the publishing users determined to include different products of the set; and
 transmit the ranking to the publishing user.

15. The computer program product of claim 11, wherein determine, by the online system, the number of content items obtained from users other than the publishing user during the time interval determined to include various products offered by the publishing user comprises:

identify a combination of products at the online system from the publishing user; and determine a number of content items obtained from users other than the publishing user during the time interval determined to include all products of the identified combination of products.

16. The computer program product of claim 15, wherein transmit information from the online system to the publishing user identifying the number of content items obtained from users other than the publishing user during the time interval determined to include one or more products offered by the publishing user comprises:

transmit the determined number of obtained from users other than the publishing user during the time interval determined to include all products of the identified combination of products from the online system to the publishing user.

17. The computer program product of claim 11, wherein transmit information from the online system to the publishing user identifying the number of content items obtained from users other than the publishing user during the time interval determined to include one or more products offered by the publishing user comprises:

rank at least a set of products offered by the publishing user based on numbers of content items obtained from users other than the publishing users determined to include different products of the set;

identify products having at least a threshold position;

generate one or more clusters for products having at least the threshold position in the ranking; and transmit information identifying the one or more clusters to the publishing user.

18. The computer program product of claim 11, wherein the non-transitory computer readable storage medium further has instructions encoded thereon that, when executed by the processor, cause the processor to:

identify a specific user of the online system;

retrieve affinities of the specific user for each of at least a set of the other users from whom the online system obtained content items;

rank at least a set of products offered by the publishing user based on numbers of content items obtained from users other than the publishing users determined to include different products of the set and affinities of the specific user for other users from whom content items determined to include different products of the set were obtained;

transmit information identifying one or more products offered by the publishing user to the specific user based on the ranking.

* * * * *

UNITED STATES PATENT AND TRADEMARK OFFICE
CERTIFICATE OF CORRECTION

PATENT NO. : 11,276,103 B2
APPLICATION NO. : 16/917866
DATED : March 15, 2022
INVENTOR(S) : Steve Morin It is certified that error appears in the above-identified patent and that said Letters Patent is hereby corrected as shown below:

In the Claims

In Column 20, Claim 3, Line 36, delete "three dimensional" and insert -- three-dimensional --, therefor.

In Column 21, Claim 10, Line 39, delete "comprising;" and insert -- comprising: --, therefor.

In Column 22, Claim 12, Line 34, delete "three dimensional" and insert -- three-dimensional --, therefor.

Signed and Sealed this
Twenty-sixth Day of July, 2022

Katherine Kelly Vidal
*Director of the United States Patent and Trademark Office*